March 22, 1960 R. E. SKOW 2,929,319
UNIVERSAL KEY INSIGNIA PRINTER
Filed Jan. 16, 1956 3 Sheets-Sheet 1

INVENTOR.
Ross E. Skow
BY
Paul E. Mullendore
ATTORNEY

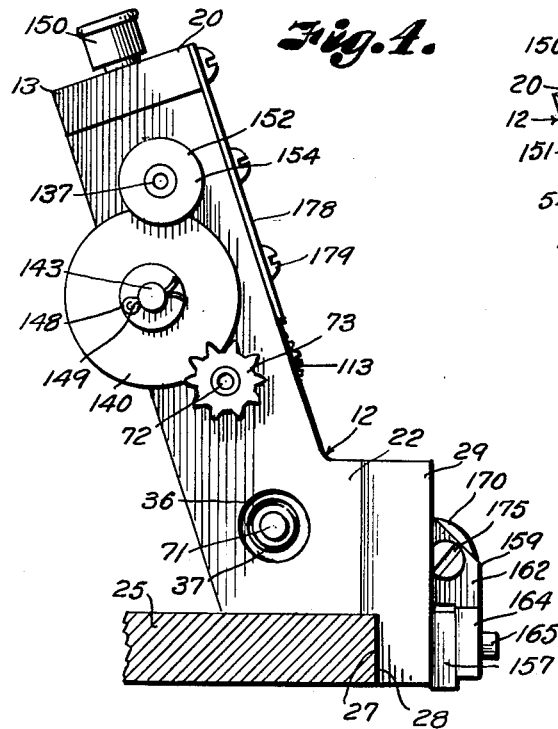
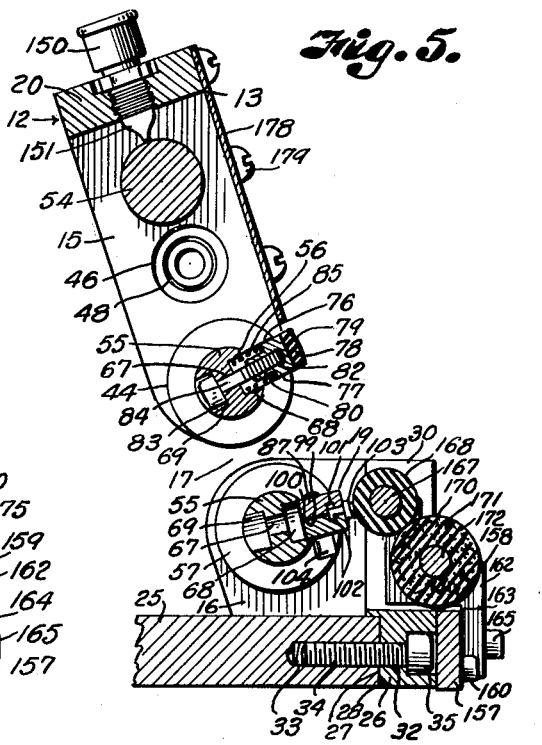
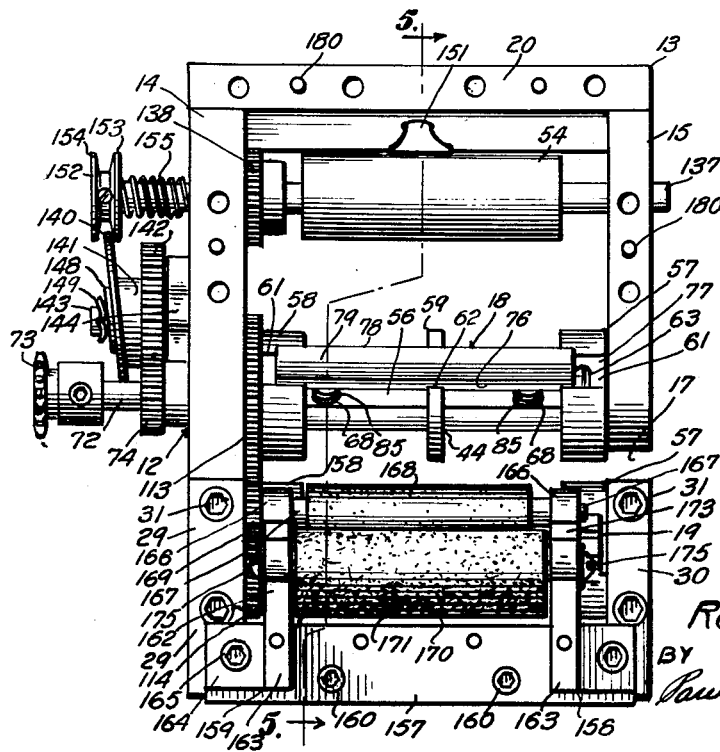
INVENTOR.
Ross E. Skow.
BY
Paul E. Mullendore
ATTORNEY March 22, 1960 R. E. SKOW 2,929,319
UNIVERSAL KEY INSIGNIA PRINTER
Filed Jan. 16, 1956 3 Sheets-Sheet 3

INVENTOR.
Ross E Skow
BY
Paul E Mullendore
ATTORNEY

United States Patent Office 2,929,319
Patented Mar. 22, 1960

2,929,319

UNIVERSAL KEY INSIGNIA PRINTER

Ross Eric Skow, Kansas City, Mo., assignor to Berkley Machine Company, Kansas City, Mo., a corporation of Missouri Application January 16, 1956, Serial No. 559,308

5 Claims. (Cl. 101—232)

This invention relates to printers of the type disclosed in my Patent No. 2,625,102, issued January 13, 1953, and which are adapted for application of key insignia to envelopes, cards, coupons, order blanks and the like.

As disclosed in the patent, many business firms advertise directly through magazines, newspapers and other similar sources, and to place this advertising in the most effective channels they desire to ascertain the ultimate effect thereof. These advertisements usually include a coupon as a part thereof which solicits information concerning the goods and services of the advertiser. These coupons have key insignia to indicate the source of the advertisement. Thus the most effective sources of advertising are established.

They also desire to know the number of returns from a particular advertisement in different areas and from various classes and fields of trade so that the effectiveness and value of their advertising methods may be appraised in accordance with the responses from the different advertising sources. This is made known by key insignia applied to self addressed envelopes, cards and the like that are enclosed with letters of solicitation, advertising literature and like information sent out to persons responding to the advertisements. When the marked envelopes or cards are returned, this information is obtained by noting the key insignia thereon. Another reason that the key insignia is used is to assure that responses are delivered to the proper department of the business doing the advertising.

Prior to the printer disclosed in the patent it was necessary to stock a great number of envelopes or other enclosures in order to provide envelopes with each of the different key insignia that are required in carrying out the program, particularly where advertisements are placed in many sources. The printer of the patent avoids this difficulty and waste of materials because of excessive printings of the envelopes, in that it is used and operated by the machine which assembles the envelopes and other enclosures such as letters of solicitation, advertising literature, et cetera, and which machine stuffs the assembled matter into mailing envelopes. Consequently, the key number which is desired may be applied simultaneously at the time of withdrawal of each envelope from the stack and only as needed.

The printing device of the patent applies the key insignia to the upper surface of the envelopes as the envelopes are withdrawn from the stack. Since the coupon, reply envelope, or the like insert which bears the key insignia carries the name and address of the person to whom the literature is sent, window envelopes are used for containing the inserts so that the name and address on the coupon appears through the window. The enclosure envelope must be fed from its stack with the window side down to permit stuffing the inserts, consequently the coupon, reply envelope or insert bearing the address must likewise be fed from the stack in face down position in order that the address will appear in the window of the enclosure envelope. In many instances it is desirable that the key insignia be printed on the face of the insert which bears the address, but prior to the present invention the extremely close spacing between the path of withdrawal of the envelopes and the assembling conveyor has made it difficult to provide a successful printer capable of operating in such small space.

It is, therefore, a principal object of the present invention to provide a key insignia printer having a sufficiently compact structure and inking mechanism to successfully print on the under surface of the envelopes as they are being withdrawn from the stack.

It is also an object of the invention to provide a universal printer adapted to print upon one and the other surfaces of the envelopes.

Further objects of the invention are: To provide a printer which requires less power to operate, particularly since the printer is actuated by the mechanism which effects withdrawal from the stacks; to provide inking mechanisms to apply the different types of ink required in printing of the insignia from above or underneath the envelopes; to provide a printer whereby the upper ink applicating roller is readily removed when printing from below, thereby preventing application of ink to the impression bar, and to provide for removal of the lower inking unit, preferably in its entirety, and ready replacement of the upper ink applicating roller when printing from above; and to provide impression bar and chase carriers or rotors which provide for easy interchange of the bar and chase when changing over to printing one or the other sides of the envelopes.

In accomplishing these and other objects of the invention as hereinafter pointed out, I have provided improved structure the preferred form of which is illustrated in the accompanying drawings wherein:

Fig. 4 is a side elevational view of the printer as viewed from the operating side thereof.

Fig. 5 is a vertical section through the printer on the line 5—5 of Fig. 6, showing the upper ink applicating roller removed and the lower inking unit in position with the impression bar in the upper rotor and the type chase in the lower rotor to effect printing on the under side of the envelopes.

Fig. 6 is a front elevational view of the printer with the cover plate removed to better illustrate the construction.

Figure 1:
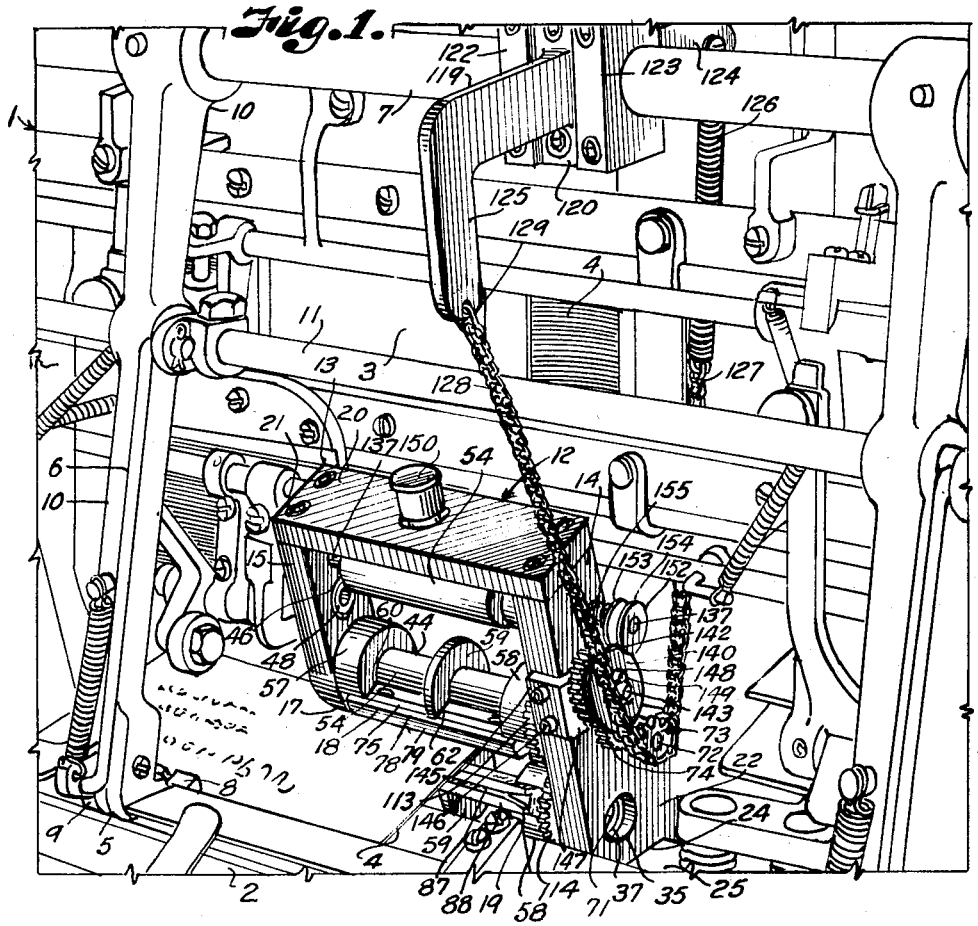
Fig. 1 is a perspective view of a portion of an inserting and mailing machine equipped with a universal printer constructed in accordance with the present invention and showing the printer set up for printing a key insignia on the under side of the envelopes as the envelopes are withdrawn, one at a time, from the stack and deposited on the assembly conveyor.

Referring more in detail to the drawings:

1 designates a portion of an automatic inserting and mailing machine used in assembling and inserting letters, advertisements, self addressed envelopes and the like within a mailing envelope. The machine 1 includes an assembling or gathering conveyer 2 along which are arranged a series of supports 3 for containing stacks of inserts to be placed in the mailing envelopes, however only the stack support which contains the inserts, to which a key insignia is to be applied, is shown in the drawings. In the illustrated instance the stack support is that which contains the self addressed coupons, envelopes or other inserts 4 that are to be assembled with the other material for insertion in the mailing envelope, this being the portion of the machine with which the present invention is to be considered.

The inserts 4, for example envelopes, are withdrawn one at a time from the bottom of the stack support by means of a gripper 5 on the end of an arm 6 that is carried by an oscillatory shaft 7. The gripper 5 includes a fixed jaw 8 and a pivoted jaw 9 that is actuated by a link mechanism 10 that connects a shaft 11 with the pivoted jaw 9 to grip the lowermost envelope in the stack when the arm swings in the direction thereof and to withdraw the envelope from the stack and carry it through a definite path for deposit on the conveyer 2 as the arm swings in the opposite direction. When the arm has carried the gripped envelope to a position over the conveyer the link mechanism 10 automatically effects opening of the jaws to drop the envelope onto the conveyer 2. The shaft 7 is oscillated under power of the machine and in timed sequence with the other operating parts thereof. The parts of the inserting and mailing machine thus briefly described specifically form no part of the present invention with the exception that the oscillatory shaft 7 is utilized in actuating the printer 12 to which the present invention pertains.

Figure 7:
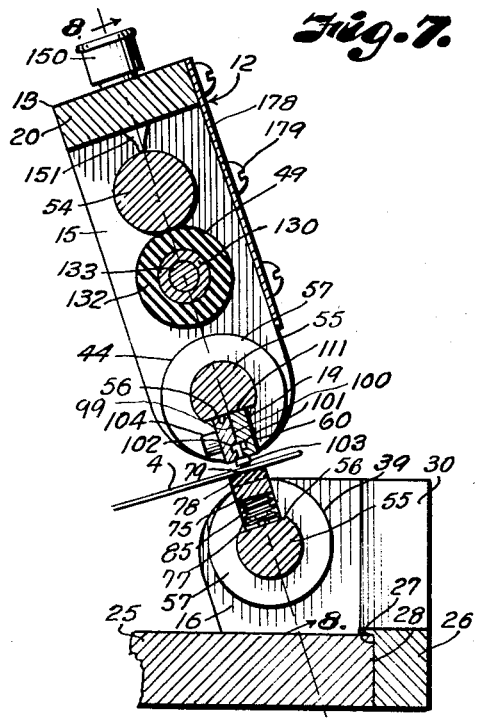
Fig. 7 is a vertical section through the printer on the line 7—7 of Fig. 8, showing the lower inking unit removed, the upper ink applicating roller in position and with the chase and impression bars in the upper and lower rotors respectively for printing on the upper surface of the envelopes.

The printer 12 includes a frame 13 having a side member 14 adapted to support the operating mechanisms of the printer in cooperation with an opposite side composed of upper and lower members 15 and 16. The upper and lower members 15 and 16 are spaced apart to provide a pass 17 therebetween in registry with the path of travel of the envelopes as they are withdrawn from the stack, as later described, and through which the gripper carries the envelopes one at a time between the impression bar and type chase 18 and 19, respectively, of the printer. The upper portion of side member 14 extends upwardly at an angle away from the stack support and is connected with the upper member 15 at the opposite side by a cross bar 20. The cross bar 20 has its ends overlapping upper ends of the respective members 14 and 15 and is connected thereto by fastening devices such as screws 21, as shown in Fig. 1. The lower end of the side member 14 has a base portion 22 that extends in the direction of the stack support in parallel relation with the lower member 16 at the opposite side of the frame. The base portion 22 and lower member 16 have underfaces 23 and 24 for support on a bar 25 which may be one of the frame members of the inserting machine 1 to support the frame 14 with the pass 17 thereof at the desired elevation with respect to the path of travel of the envelopes. The ends of the base portion 22 and the lower member 16 are connected on the side adjacent the stack support by a cross bar 26. The cross bar 26 has a face side 27 (Figs. 5, 7 and 8) lapping the side face 28 of the bar 25. Extending upwardly from the ends of the cross bar 26 are uprights 29 and 30 which form continuations of the lower member 16 and base portion 22 respectively and which are connected thereto by fastening devices such as screws 31, Fig. 6, to complete the frame of the printer. The cross bar 26 has spaced apart apertures 32 that register with internally threaded bores 33 that are provided in the face side 27 of the bar 25 to accommodate fastening devices such as screws 34 (Fig. 5) by which the frame of the printer is rigidly attached to the bar 25. The heads 35 of the screws 34 are preferably countersunk within the cross bar 26 as shown in Fig. 5 to avoid interference with the lower inking unit, later to be described.

The lower member 16 of the frame and the opposite base portion 22 of the side member 14 have aligned registering openings 35 and 36 for mounting therein anti-friction bearings 37 and 38 that journal a lower rotor 39 of the printer to position that rotor below the path of travel of the envelopes. The lower end of the upper member 15 and the side member 14 also have aligned registering openings 40 and 41 to accommodate anti-friction bearings 42 and 43 to journal and support an upper rotor 44 above the path of travel of the envelopes to cooperate with the lower rotor in carrying the impression and chase bars 18 and 19 as to be later described. Also formed in the upper member 15 and the side member 14 at a point above the openings 40 and 41 are similar openings 45 and 46 mounting anti-friction bearings 47 and 48 to journal an ink applicating roller 49 of the upper printing mechanism. Also formed in the side member 14 and member 15 above the latter openings 45 and 46 are openings 50 and 51 to accommodate bushings 52 and 53 which form bearings for an ink distributing roller 54 of the upper printing mechanism.

Figure 9:
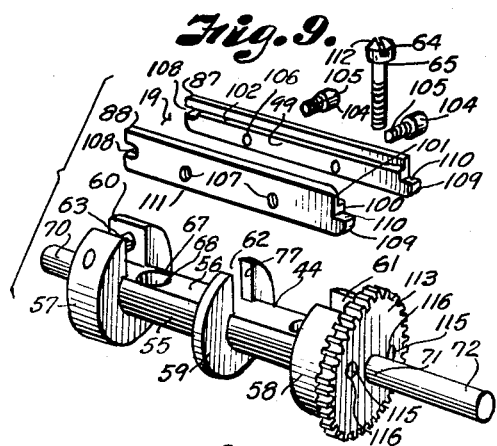
Fig. 9 is a perspective view of the upper rotor and chase bar shown in disassembled spaced relation.
Figure 8:
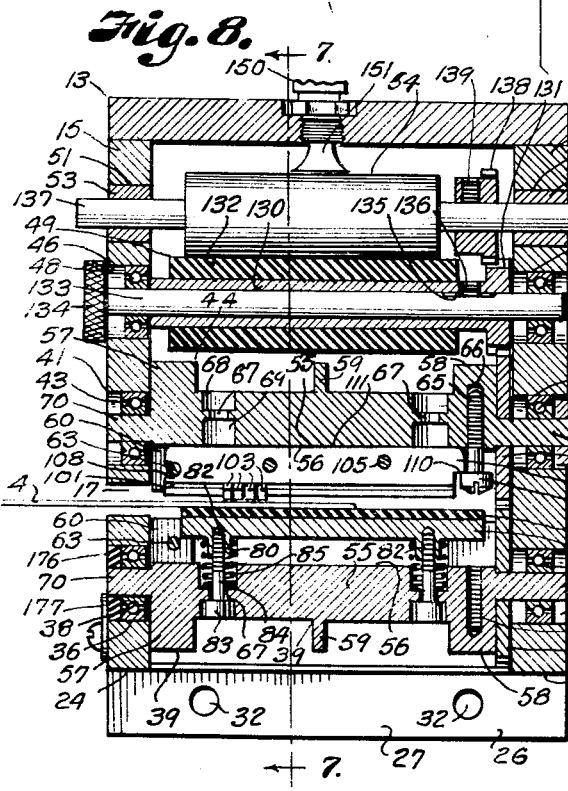
Fig. 8 is a section on the line 8—8 of Fig. 7.

The lower and upper rotors 39 and 44 are of substantially the same construction and each includes a shaft portion 55 having a flattened side face 56 extending along the length of the shaft portion 55, as best shown in Figs. 8 and 9. Carried on the shaft portion 55 at the ends thereof are relatively thick disk portions 57 and 58 cooperating with an intermediate relatively thinner disk portion 59 to mount the chase bar 19 or impression bar 18, as the case may be. The disk portions 57, 58 and 59 have notches 60, 61 and 62 extending inwardly from the peripheries thereof and in registry with the flattened side face 56, as best shown in Fig. 9, to accommodate therein the chase or impression bars. Extending across the notch 60 of the end disk portion 57 is a pin 63 having its ends supported within the disk portion as shown in Fig. 9 and which is adapted to anchor that end of the chase bar 19. The opposite end of the chase bar 19 is secured within the notch 61 of the opposite disk portion 58 by the head 64 of the screw 65 having the shank thereof turned within a threaded opening 66 (Fig. 8) extending transversely of the disk portion 58 at the bottom of the notch 61. The shaft portions of both rotors also have spaced apart transverse openings 67 positioned therein in offset relation with the end disk portions and in registry with the flat face sides 56 of the shaft portions 55, the openings 67 having counterbored ends 68 and 69 for a purpose later described. The upper and lower rotors also have spindle portions 70 and 71 projecting coaxially from the ends of the shaft portions 55 for journalling of the rotors within the anti-friction bearings 37—38 and 42—43 respectively. The spindles, with the exception of the spindle 71 of the upper rotor, may terminate in plane with the outer side faces of the frame members. However, the spindle 71 for the upper rotor has extension 72 projecting from the side member of the frame to mount a sprocket 73 and a gear 74 as shown in Fig. 8.

The impression bar 18 is adapted for mounting on either rotor and includes a rigid body portion 75 which is adapted to fit snugly within the notches of the disk portions of the respective rotors with opposite side edges 76 thereof, sliding between opposite side faces 77 of the notches whereby the impression bar may move up and down within the notches but be retained in fixed position with respect to the rotational direction of the rotors. The outer face of the body portion of the bar is faced with a strip of resilient material 78 having a rounding outer face 79. Depending from the opposite or inner side of the body portion of the bar are bosses 80 each provided with transverse slots 81 and having internally threaded openings 82 registering coaxially with the openings 67 in the shaft portions of the rotors. The impression bar is retained on one or the other of the rotors by fastening devices such as screws 83 having threaded shank portions 84 extending loosely through the openings 67 and through coil springs 85 which have ends seated within the counterbores 68 and their upper ends encircling the slotted bosses 80, the threaded shanks of the screws being turned into the threaded openings 82 of the bosses, as best shown in Fig. 8. The slots 81 permit the sides of the bosses to be pressed together so as to produce a gripping effect upon the threaded shanks of the screws to prevent loosening thereof when the printer is in operation. The heads 86 of the screws are normally engaged within the counterbores 69 and seat against the bottoms thereof to retain the rounding face of the impression bar in proper radial position under action of the coil springs 85, however, the impression bar 18 is yieldable inwardly of the notches when printing pressure is applied thereon, the springs yielding and the shanks of the screws moving through the openings in the shaft portions of the rotor.

The chase bar 19 includes two parallel jaws 87 and 88 having facing sides 99 and 100 provided with registering grooves 101 and 102 to mount type 103 therein. The strips are held in face-to-face contact and in gripping relation with the type by fastening devices such as screws 104 having threaded shanks 105 extending through openings 106 in one of the bars and into threaded openings 107 of the other bar (see Figs. 8 and 9). The chase bar when assembled with the type fits snugly within the notches of the disk portions of either of the rotors and one of the ends thereof has a transverse notch 108 to engage the cross pin 63 for the rotor which is to carry the chase bar. The opposite end of the chase bar has a tongue 109 forming a shoulder 110 that is inset from the outer side edges of the bar to engage under the head 64 of the screw 65 previously mentioned and which clamps the inner edge face 111 of the chase bar against the flattened face of the shaft as shown in Fig. 8. If desired, one diametrical side of the screw may be flattened as indicated at 112 in Fig. 9, so that when the flat side of the screw is turned in the direction of the cross pin the tongue 109 will pass the flattened side when the chase bar is applied. It is necessary to give the screw only a partial turn to bring the opposite diametrical side of the head into clamping contact with the shoulder of the tongue.

Figure 10:
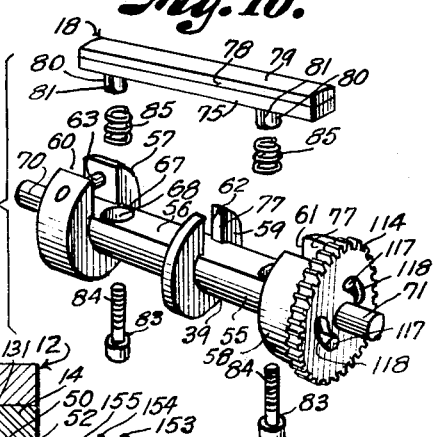
Fig. 10 is a similar view of the lower rotor and impression bar shown disassembled with the parts in spaced relation.

The spindle 71 of each rotor carries a gear 113 for the upper rotor and 114 for the lower rotor. The gears seat against the flat sides of the end disks 58 as shown in Figs. 6, 8 and 9, with the outer faces engaging the inner faces of the side member 14 of the frame. The gear 113 for the upper rotor is fixed from rotation on the shaft by means of pins 115 that project from the outer side faces of the disk portions and into openings 116 of the gear 113. The gear 114 is secured in driving relation with the rotor by similar pins 117 but has a slight rotational movement on the spindle as provided by arcuate slots 118 that are provided in the gear 114 as shown in Fig. 10. When the rotors are in position in the frame the teeth of the gears mesh so that oscillation of the sprocket 73 on the shaft extension effects oscillation of both of the rotors. This is effected simultaneously with oscillation of the rock shaft 7 that carries the gripper arms 6, as now to be described.

Mounted on the oscillatory shaft 7 in line with the sprocket wheel 73 is a rocker arm 119 which includes a hub portion 120 that is suitably fixed to the shaft between clamps 122 and 123 similar to the rocker arm disclosed in the above mentioned patent. The rocker arm 119 has one end 124 extending in the direction of the stack support 3 and the opposite end has a downwardly extending terminal 125. Connected with the end 124 is a coil spring 126 having its opposite end connected with the end 127 of a chain 128 that extends downwardly and under the sprocket 73 and then upwardly to connect with the terminal 125 of the arm as indicated at 129. Thus when the oscillatory shaft is in motion a similar motion is imparted to the rocker arm 119 to move the chain 128 and effect oscillation of the sprocket 73 to produce oscillation of the rotors. The spring 126 compensates for the length of the chain and keeps the chain in operative contact with the sprocket. The spring also absorbs any shock that might be transmitted to the printer through the chain in direction of the actuating force.

The ink applying roller 49 includes a sleeve like core 130 of sufficient length to extend across the width of the frame and which carries a gear 131 at the end thereof to mesh with the gear 113 of the upper rotor (Fig. 8). Mounted on the sleeve like core is a resilient facing 132 preferably formed of synthetic rubber so that it is not affected by the ink used when applying the key insignia to the upper face of the envelopes. The roller assembly is removably mounted in the bearings 47 and 48 by means of a removable pin or shaft 133, one end of which projects from the upper side member of the frame and carries a knob 134 (Fig. 8) to facilitate insertion and removal of the pin as when removing or placing the ink applicating roller. When the roller is in position the sleeve like core thereof is secured to a flattened portion 135 by a set screw 136 as shown in Fig. 8. The ink distributing roller 54 is of less length than the ink applicating roller and is retained between the side members of the frame on a reciprocating shaft 137 having its ends slidably journalled in the bushings 52 and 53 previously mentioned. The ink distributing roller 54 is rotated by a gear 138 that is fixed to the shaft 137 by means of a set screw 139 to retain the gear in sliding meshing contact with the teeth of the gear 131 previously described. The distributing roller is reciprocated by means of a wobble plate 140 that is carried on the hub 141 of the gear 142. The gear 142 is rotatable on a stub shaft 143 that is carried by a bracket 144 attached to the side member 14 of the frame in a position to retain the teeth of the gear in meshing relation with the teeth of the gear on the shaft extension previously described. The bracket 144 includes a plate portion 145 that is secured to the side edge of the frame by fastening devices 146 as best shown in Fig. 1. The bracket also has a portion 147 extending laterally of the plate alongside of the frame member to carry the stub shaft. The gear and wobble plate assembly is retained on the stub shaft 143 by means of a washer 148 and a cotter-pin 149.

Ink is supplied to the distributing roller 54 from a front 150 that is carried by the top cross bar 20 of the frame 13 and has a nozzle 151 that conducts the ink onto the periphery of the distributing roller 54. Fixed on the shaft 137 is a wheel 152 having spaced flanges 153 and 154 to engage the respective sides of the wobble plate to transmit the reciprocatory motion to the ink distributing roller. A coil spring 155 is sleeved on the shaft 143 to bear against the side member 14 of the frame 13 and against the wheel 152 to assist in movement of the roller 54 in one direction.

Figure 2:
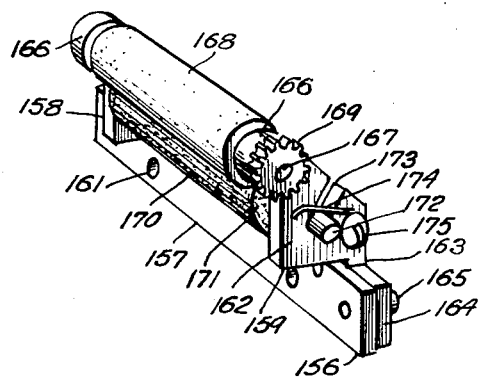
Fig. 2 is a perspective view of the inking unit which is inserted in the printer when printing on the under side of the envelopes.

The inking unit for the under printing is best shown in Fig. 2 and includes a supporting frame 156 having a transverse bar 157 carrying spaced apart brackets 158 and 159. The bar 157 is adapted to extend along the length of the lower cross bar 26 of the frame 13 and may be secured thereto by fastening devices such as screws 160 having their threaded shanks extending through openings 161 in the bar 157 and into threaded sockets of the cross bar of the frame. The brackets 158 and 159 include plate portions 162 extending over the upper edge of the bar 157 and into the space between the side members of the frame 13 as shown in Fig. 6. The plate portions 162 have portions 163 depending on the outer side of the bar 157 and carry laterally directed ears 164 that are secured to the ends of the bar 157 by fastening devices such as screws 165. The plate portions terminate in bearing portions 166 for journalling the shaft 167 of an ink applicating roller 168 that is carried between the brackets 158 and 159 and in position to be contacted with the type when underneath printing is desired. The shaft 167 of the ink applicating roller carries a gear 169 which meshes with the gear 114 of the lower rotor whereby the ink applicating roller 168 is operated by the operating mechanism for the rotors. Ink is applied to the applicating roller 168 from a roller 170 which includes a cylindrical body of synthetic sponge rubber 171 carried on a shaft 172. The shaft 172 has projecting ends retained in the bottoms of slots 173 that extend downwardly through the upper edge of the plate portions 162 of the brackets 158 and 159. The ends of the shaft 172 are retained against the bottom of the slots 173 by spring retainers 174 which bear on the ends of the shaft and are retained in bearing contact by attachment thereof to the plate portions of the brackets by screws 175. A slight drag is applied to the shaft 172 by means of a resilient washer 176 that is pressed over the end of the shaft and into the opening 36 alongside the bearing 38. The washer 176 is retained in position by a flat spring 177 that bears upon the outer side of the washer (see Fig. 8). The drag produced controls rotation of the ink roller, producing smooth rotation thereof under the oscillatory drive. If desired, cover plate 178 may be applied to the side of the frame nearest the stack to stiffen the frame 13 and shield the envelopes in the stack. The plate 178 may be secured by screws 179 and dowel pins 180.

In printing on the top side of the inserts 4, the bottom inking unit is removed. This is accomplished by removing the screws 160 and lifting the unit out of the frame 13. The type 103 are slid into the grooves of the plates 87 and 88 of the chase bar 19 and the screws 104 are tightened to clamp the type in the proper position in the chase to apply the key in the desired position on the inserts 4. The screw 65 is turned to bring the flat side 112 of the head 64 on the side nearest the cross pin 63. The notched end of the chase bar is then inserted in the notch 60 of the upper rotor 44 with the notch 108 engaging the cross pin 63. The chase bar 19 is then pushed into the notches 62 and 61 until the edge 11 thereof seats on the flat side 56 of the rotor shaft 55. The tongue 109 clears the flat side of the screw head 64. The screw 65 is then turned to bring the head 64 into contact with the shoulder 110 to tighten the chase bar in the rotor. The ink applicating roller 49 is placed in the space between the upper rotor and the ink distributing roller 54 with the ends in coaxial registry with the bearings and the teeth of the gear 131 meshing with the teeth of the gears 138 and 113. The pin 133 is now passed through the bearing 48, core 130 of the roller 132 and through the bearing 47. The set screw 136 is then tightened against the flat portion 135 of the pin. The impression bar is inserted within the notches 60, 61 and 62 of the lower rotor 39 after the springs 85 have been placed in the counter bores 68. The slotted bosses 80 of the bar fit within ends of the springs 85. The shanks 84 of the screws 83 are inserted in the openings 67 and screwed into the threaded sockets 82 of the bosses 80. The ink fountain 150 is filled with ink, such as an "Addressograph" ink.

With the machine 1 in operation the shaft 7 oscillates to swing the arm 10 to and from the stack support 3. The rocker arm 119 being attached to the shaft 7, rocks up and down to move the chain 128 which oscillates the sprocket 73, upper rotor 44 and effects counter oscillation of the lower rotor 39 by reason of the intermeshing gears 113 and 114. The ink applicating roller 49 is rotated first in one direction and then the other by the smaller gear 131 meshing with the larger gear 113. The ink distributing roller 54 is similarly rotated by the gear 138 meshing with the gear 13. The ink distributing roller is simultaneously reciprocated in an axial direction to spread the ink upon the ink applicating roller 49. This is effected by the gear 74 on the spindle 71 of the upper rotor 44 meshing with the gear 142 which rotates the wobble plate 140. Rotation of the wobble plate causes the periphery thereof to engage first one flange of the wheel 52 and then the other to reciprocate the roller 54. The ink flows from the fountain 150 through the nozzle 151 onto the ink distributing roller which transfers the ink onto the ink applicating or transfer roller 49 which in turn applies the ink to the type in the chase bar when the type makes contact with the applicating roller. Attention is here directed to the fact that the sprocket 73 is sized so that the rotors make only a partial revolution in each direction. However, it is sufficient to bring the type into contact with the ink distributing roller to receive the ink and then into contact with the insert 4 as the insert is being carried through the pass 17 by the gripper 5 of the arm 10. When the type are in printing contact with the insert the impression bar 18 has moved in timed relation therewith to back the insert, the timing being maintained by the gears 113 and 114. The speed of the insert through the pass 17 corresponds with the speed of oscillation of the face of the type to maintain a clean imprint of the type on the insert 4. On return movement of the rotors the lower rotor which carries the impression bar lags behind the rotor which carries the type chase so that the type are out of registry with the impression bar to avoid the ink which may remain on the type from offsetting upon the impression bar. This is brought about by the lost motion connection produced by the pins 117 and slots 118. The gear 131 has a size relatively to the driving gear 113 to effect full revolution of the ink distributing and applicating rollers to provide for proper distribution of the ink.

When it is desired to print the key insignia on the under side of the inserts 4, the applicating roller 49 is removed. This is effected by loosening the set screw 136 and pulling on the knob 134 to withdraw the pin 133 from inside the roller 49. The roller 49 will then fall freely into the hand and it is not necessary to take apart the frame 14. The chase bar 19 and impression bar 18 are now removed from the rotors 44 and 39, and replaced with the chase bar, the chase bar being inserted in the lower rotor 39 and the impression bar 18 in the upper rotor 44. Since the rotors are of like construction the bars are applied in the respective rotors as previously described. The bottom printing unit is placed in the frame 13 with the rollers thereof passing into the space between the portion 22 of the side member 14 and the lower side member 16 with the cross bar 157 thereof engaging the face 28 of the bar 26. Care is taken to note that the teeth of the gear 169 mesh properly with the teeth of the gear 114. The screws 160 are then inserted and tightened to hold the printing unit firmly in place. The sponge facing 171 of the roller 170 is saturated with an ink of the type used in stamp pads. One brand which is suitable is "Carter's Stamp Pad Ink."

Figure 3:
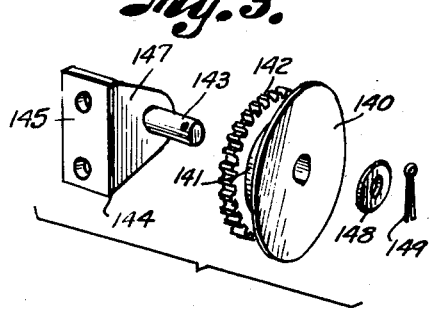
Fig. 3 is a perspective view of parts of the supporting bracket and wobble plate for reciprocating the inking roller when printing on the upper surface of the envelopes.

The wobble plate unit shown in Fig. 3 is removed by taking out the screws 146.

When the machine 1 is in operation, the withdrawal of the inserts is the same but the key insignia is now printed on the under faces thereof. The roller 168 picks up the ink from the sponge facing of the roller 170 and transfers it to the type which come into contact therewith upon oscillation of the type chase and impression bar rotors in the manner previously described. However, on the return movement of the rotors, after a printing operation, the lower rotor again lags so that the impression bar first moves out of registry with the chase bar to avoid offsetting any ink from the type onto the impression bar after the printed insert has passed and dropped onto the assembly conveyor.

The bottom printing unit constructed as described operates satisfactorily in the small space in which it must be accommodated, and therefore under printing is practicable without altering the placement of the inserts in the stack support or changing the path of the inserts from the conventional.

It is therefore apparent that I have provided a universal printer for inserting and mailing machines so that a key insignia can be applied to either side face of the inserts.

What I claim and desire to secure by Letters Patent is:

1. A key insignia printer for an inserting and mailing machine having means for supporting a stack of inserts alongside of a gathering conveyer and having an oscillatory gripper for withdrawing the inserts from the stack supporting means and carrying the inserts one at a time through a fixed path for deposit on the gathering conveyor, said key insignia printer including a frame adapted for support between the stack support and the gathering conveyer and having a pass in registry with the path of the inserts when carried by the gripper, rotors having rotatable support in the frame above and below said pass, each of said rotors having a shaft portion and spaced disk portions on said shaft portion, said disks being provided with recesses extending inwardly from peripheries of the disk portions towards said shaft portions, a pin extending across the recesses at one end of each rotor, a screw in the recesses at the other end of the rotors and having a head thereon, said shaft portions of the rotors having spaced apart openings extending therethrough, a chase bar having a notch at one end and a shoulder at the other adapted to engage the pin and head of the screw respectively when inserted in the recesses of one and the other of the rotors, an impression bar having internally threaded bosses adapted to register with the openings in said shaft portions when the impression bar is inserted in the recesses in one and the other of said rotors to cooperate with the chase bar, springs between the impression bar and the shaft portion of the rotor in which the impression bar is inserted, screws extending through the openings of said shaft portion and into the internally threaded sockets for retaining the impression bar for yielding support by said springs under printing pressure of type carried in the chase bar, and inking means adapted for insertion in the frame below said pass for supporting an ink applying means, depending upon the rotor in which the chase bar is mounted, and means for actuating the rotors in timed relation with the gripper.

2. A key insignia printer for an inserting and mailing machine having means for supporting a stack of inserts alongside of a gathering conveyer and having an oscillatory gripper for withdrawing the inserts from the stack supporting means and carrying the inserts one at a time through a fixed path for deposit on the gathering conveyor, said key insignia printer including a frame adapted for support between the stack support and the gathering conveyer and having a pass in registry with the path of the inserts when carried by the gripper, rotors having rotatable support in the frame above and below said pass, each of said rotors having a shaft portion and spaced disk portions on said shaft portion, said disks being provided with recesses extending inwardly from peripheries of the disk portions towards said shaft portions, a pin extending across the recesses at one end of each rotor, a screw in the recesses at the other end of the rotors and having a head thereon, said shaft portions of the rotors having spaced apart openings extending therethrough, a chase bar having a notch at one end and a shoulder at the other adapted to engage the pin and head of the screw respectively when inserted in the recesses of one and the other of the rotors, an impression bar having internally threaded bosses adapted to register with the openings in said shaft portions when the impression bar is inserted in the recesses in one and the other of said rotors to cooperate with the chase bar, springs between the impression bar and the shaft portion of the rotor in which the impression bar is inserted, screws extending through the openings of said shaft portion and into the internally threaded sockets for retaining the impression bar for yielding support by said springs under printing pressure of type carried in the chase bar, means above and below said pass for supporting an ink applying means, an ink applying means adapted for support in one and the other of said supporting means depending upon the rotor in which the chase bar is mounted, and means for actuating the rotors in timed relation with the gripper.

3. A key insignia printer of the character described having a pass for an insert to be printed, rotors having rotatable support in the frame above and below said pass, each of said rotors having a shaft portion and spaced disk portions on said shaft portion, said disks being provided with recesses extending inwardly from peripheries of the disk portions towards said shaft portions, a pin extending across the recesses at one end of each rotor, a screw in the recesses at the other end of the rotors and having a head thereon, said shaft portions of the rotors having spaced apart openings extending therethrough, a chase bar having a notch at one end and a shoulder at the other adapted to engage the pin and head of the screw respectively when inserted in the recesses of one and the other of the rotors, an impression bar having internally threaded bosses adapted to register with the openings in said shaft portions when the impression bar is inserted in the recesses in one and the other of said rotors to cooperate with the chase bar, springs between the impression bar and the shaft portion of the rotor in which the impression bar is inserted, screws extending through the openings of said shaft portion and into the internally threaded sockets for retaining the impression bar for yielding support by said springs under printing pressure of type carried in the chase bar, means above and below said pass for supporting an ink applying means, an ink applying means adapted for support in one and the other of said supporting means depending upon the rotor in which the chase bar is mounted, and means for actuating the rotors.

4. A key insignia printer for an inserting and mailing machine having means for supporting a stack of inserts alongside of a gathering conveyor and having an oscillatory gripper for withdrawing the inserts from the stack supporting means and carrying the inserts one at a time through a fixed path for deposit on the gathering conveyor, said insignia printer including a frame adapted for support on said machine between the stack support and the gathering conveyor and having a pass in registry with the path of the inserts when carried by the gripper, rotors having rotatable support on the frame above and below said pass respectively, said rotors having transverse recesses extending inwardly from peripheries of the rotors, a pin extending across the recess at one end of the rotor below the pass, a clamping member in the recess at the other end of said rotor below the pass, said other rotor having spaced apart openings extending diametrically therethrough, a chase bar having a notch at one end and a shoulder at the other adapted to engage the pin and clamping member, an impression bar having internally threaded openings adapted to register with the openings of the rotor above the pass to cooperate with the chase bar, springs under the impression bar, screws extending through the openings of said rotor above the pass and into the internally threaded openings of the impression bar for retaining the impression bar for yielding support on said springs under printing pressure of type carried by the chase bar, inking means adapted for insertion in the frame below said pass for applying ink to the type in the chase bar, and means for actuating the rotors in timed relation with the gripper.

5. A key insignia printer for an inserting and mailing machine having means for supporting a stack of inserts alongside of a gathering conveyor and having an oscillatory gripper for withdrawing the inserts from the stack supporting means and carrying the inserts one at a time through a fixed path for deposit on the gathering conveyor, said insignia printer including a frame adapted for support on said machine between the stack support and the gathering conveyor and having a pass in registry with the path of the inserts when carried by the gripper, rotors having rotatable support on the frame above and below said pass respectively, said rotors having transverse recesses extending inwardly from peripheries of the rotors, pins extending across the recesses at one end of each rotor, a clamping member in the recesses at the other end of each rotor, said rotors having spaced apart openings extending diametrically therethrough in registry with the recesses, interchangeable chase and impression bars, said chase bar having a notch at one end and a shoulder at the other adapted to engage the pin and clamping member respectively, when inserted in the recesses of one rotor, said impression bar having internally threaded openings adapted to register with the openings of the other rotor when the impression bar is inserted in the recess of said rotor to cooperate with the chase bar, springs between the impression bar and said other rotor in which the impression bar is inserted, screws extending through the openings of said other rotor and into the internally threaded openings of the impression bar for retaining the impression bar for yielding support on said springs under printing pressure of type carried by the chase bar, inking means carried by the frame for applying ink to the type of the chase bar when the chase bar is carried by the rotor above said pass, inking means adapted for insertion in the frame below said pass for applying ink to the type when the chase bar is applied to the rotor below said pass, and means for actuating the rotors in timed relation with the gripper.

References Cited in the file of this patent

UNITED STATES PATENTS

| | | |
|---|---|---|
| 338,046 | Eddy | Mar. 16, 1886 |
| 449,110 | Dolphin | Mar. 31, 1891 |
| 978,839 | Bremer et al. | Dec. 20, 1910 |
| 2,358,284 | Davidson et al. | Sept. 12, 1944 |
| 2,625,102 | Skow | Jan. 13, 1953 |
| 2,635,540 | Atwood | Apr. 21, 1953 |
| 2,767,651 | Willsea | Oct. 23, 1956 |